July 27, 1926.
V. C. BOX ET AL
AUTOMATIC TRAP NEST
Filed June 3, 1924
1,594,293
2 Sheets-Sheet 1
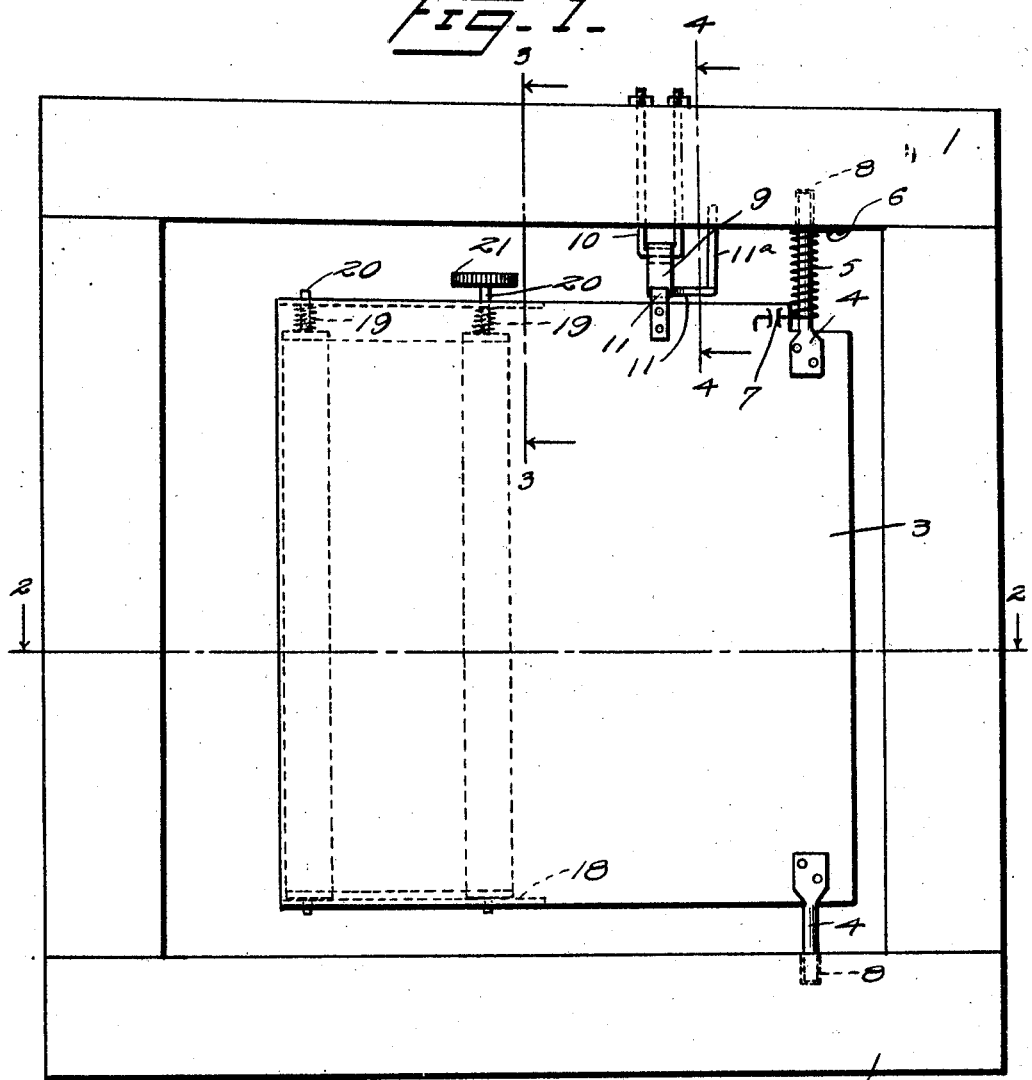
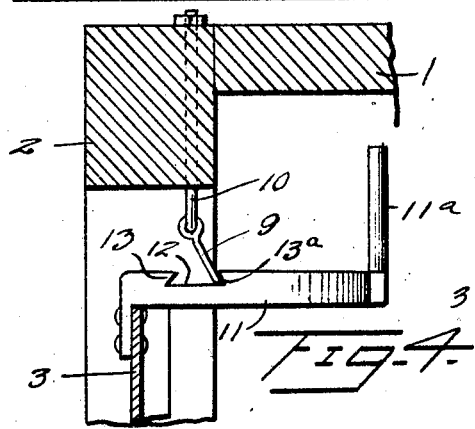
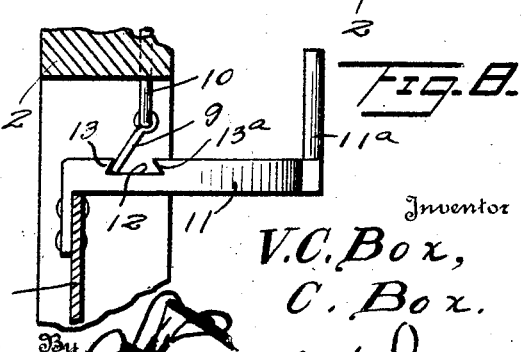
Inventor
V. C. Box,
C. Box.

July 27, 1926.
V. C. BOX ET AL
1,594,293
AUTOMATIC TRAP NEST
Filed June 3, 1924     2 Sheets-Sheet 2
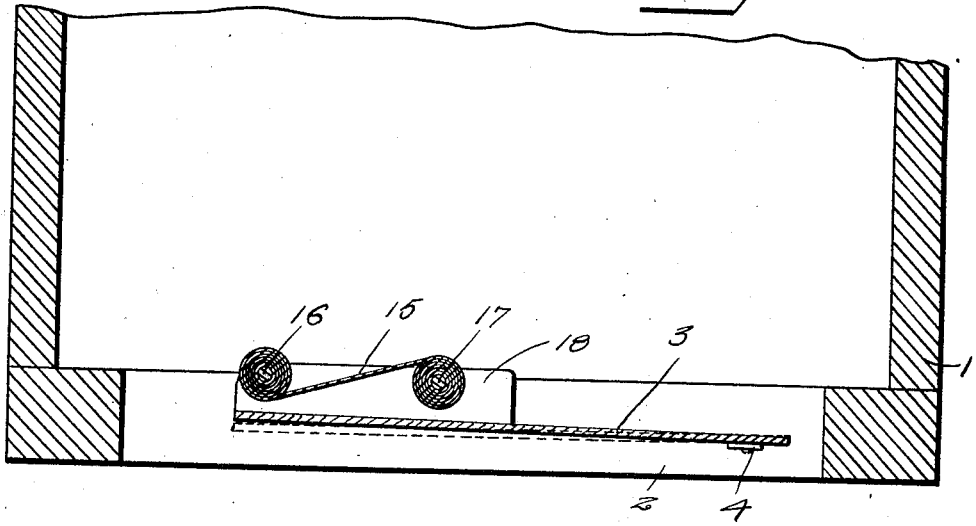
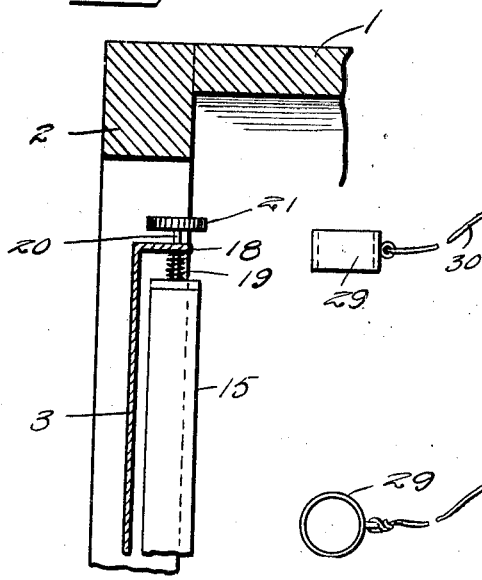
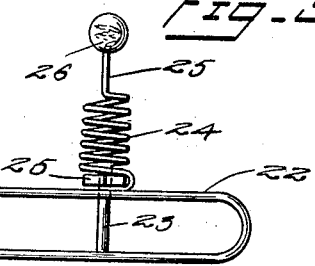
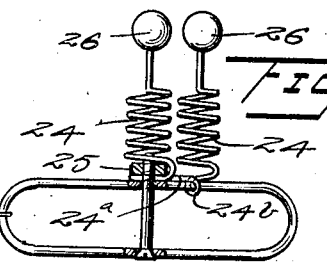
Inventor
V. C. Box,
C. Box.
By
Attorney Patented July 27, 1926.

1,594,293

UNITED STATES PATENT OFFICE.

VIRGIL C. BOX AND CLARENCE BOX, OF BLUE RIDGE, TEXAS.

AUTOMATIC TRAP NEST.

Application filed June 3, 1924. Serial No. 717,591.

This invention relates to trap nests for poultry, and more particularly to nests of this kind having a single opening through which the hen enters and leaves the nest.

The invention has for one of its objects the provision of a door for the entrance and exit opening of the nest which shall be adapted to be swung inwardly by a hen when entering the nest and outwardly by the hen when leaving the nest and which shall be equipped with a record sheet upon which an identifying mark is made by the hen when leaving the nest.

A further object of the invention is the provision of novel means to be carried by the hen for producing the identifying mark upon the record sheet.

A further object of the invention is the provision of a novel latch adapted to be actuated by the inward and outward swinging movements of the door so as to secure the door against inward but not outward swinging movement after a hen has once entered the nest.

With the above and other objects in view, the invention consists in the construction, combination and arrangement of parts hereinafter fully described and claimed, and illustrated in the accompanying drawings, wherein:—

Figure 1 is a view in front elevation of a trap nest door constructed in accordance with my invention, Figure 2 is a sectional view taken on the horizontal plane indicated by the line 2—2 of Figure 1, Figure 3 is a sectional view taken on the vertical plane indicated by the line 3—3 of Figure 1, Figure 4 is a sectional view taken on the vertical plane indicated by the line 4—4 of Figure 1, illustrating the latch in position to permit the door to be moved inwardly, Figure 5 is a detail view in side elevation of the marker, Figure 6 is a similar view of a slightly modified form of the marker, Figure 7 is a detail view illustrating the manner in which the crayon is secured to the marker, and Figure 8 is a view similar to Figure 4 illustrating the latch in position to secure the door against inward movement.

Referring to the drawings by reference numerals 1 designates a fragmentary portion of the body or casing of a trap nest which may be of any well known construction.

In accordance with our invention a frame 2 is secured to the open front end of the body 1 of the trap nest. On entering and leaving the trap nest, the hens pass through the frame 2. A door 3 is swung at one end within the frame 2 on pintles 4. A spring 5 which is mounted upon one of the pintles 4 and which has one of its ends secured to the frame 2 as at 6 and its other end to the door 3 as at 7, serves to normally retain the door in closed position. The frame 2 is provided with sockets 8 for the reception of the pintles 4. The door is preferably made of sheet metal, its area is less than that of the opening of the frame 2, and it is, as shown, preferably mounted to swing about a vertical axis. The door 3 is adapted to be swung inwardly by a hen entering the nest and outwardly by a hen leaving the nest and when the hen has moved out of contact with it the door is returned to closed position by the spring 5.

The means for securing the door 3 against inward movement after a hen has entered the nest, comprises a latch 9 which is pivotally suspended above the door 3 by a U-shaped bolt 10 carried by the frame 2, and an arcuate bar 11 which is secured to and projects inwardly from the upper edge of the door and which is recessed as shown at 12 to provide shoulders 13 and 13ª. When in position to secure the door against inward movement, the latch 9 occupies a downwardly and outwardly inclined position with its free end in contact with the shoulder 13, as shown in Figure 8, and when in position to permit the inward movement of the door, it occupies a downwardly and inwardly inclined position with its lower end in contact with the shoulder 13ª, as shown in Figure 4. When it is desired to permit the use of the nest, the latch 9 is manually set in the position shown in Figure 4, in which position it holds the door in a partly inwardly opened position so as to induce a hen to enter the nest. During the entrance of a hen into the nest, the bar 11 passes out of contact with the latch 9, leaving the latch hanging vertically. After the hen has passed out of contact with the door 3, the spring 5 returns the door to its closed position. During this movement of the door, the outer end of the bar 11 contacts with the latch 9 and swings it in an upward and outward direction, and the latch 9 rests against the upper side of the bar 11 until it drops into the recess 12. When the door comes to rest, the latch 9 occupies a downwardly and forwardly inclined position with its free end in contact with the shoulder 13. It will thus be seen that after a hen enters the nest, the door 3 cannot be moved inwardly but that it may be moved outwardly, with the result that the hen within the nest cannot be disturbed, that it may leave at any time, and that the nest cannot be again occupied until the latch is manually moved into its downwardly and inwardly inclined position. The curvature of the bar 11 corresponds to an arc of a circle having the pivot of the door 3 for its center. The bar 11 is provided with a vertical arm 11ª which is adapted to limit the outward movement of the door 3.

To secure a record of the laying capacity of the hens using the nest, a record sheet 15 is provided. This record sheet is wound upon a roller 16 and is adapted to be manually unwound therefrom onto a roller 17. These rollers are journaled in flanges 18 which extend inwardly from and are arranged in perpendicular relation with respect to the door 3. To prevent any accidental movement of the rollers 16 and 17 springs 19 are employed. The springs 19 are mounted upon the upper journals 20 of the rollers 16 and 17 between the upper ends of the rollers and the upper flange 18, the journal 20 of the roller 17 being provided with a milled wheel 21 through the medium of which this roller may be turned to wind the record sheet thereon. A marker which comprises a clasp 22 in the form of a loop is secured to a wing of each hen by a bolt 23. A spring 24 is secured to the loop 22 by means of the bolt 23, and it is provided at its outer end with a stem 25 to which a ball of crayon 26 is secured. The outer end of the stem 25 is bent to provide two or more convolutions 27 about which a thread 28 is wound in the manner illustrated in Figure 7. The convolutions 27 and the thread 28 provide an enlarged head of skeleton formation about which the ball of crayon 26 may be readily moulded. Due to its construction, the head will prevent the accidental displacement of the crayon ball 26. The marker is secured to wing of a hen with the spring 24 extending laterally from the hen, whereby to cause the crayon ball 26 to contact with that part of the record sheet 15 carried by the roller 16 during the passage of the hen from the nest. Due to the fact that the crayon ball 26 is connected to the loop 22 by the spring 24, it will yield while it is in contact with the record sheet 15 and prevent injury to the record sheet and to the crayon ball. In order to prevent the hen from raising its wing, while leaving the nest, far enough to prevent the crayon ball 26 contacting with the record sheet 15, a ring 29 is adapted to be passed about a leg, and the ring is connected to the loop 22 by a flexible element 30. Two or more crayons 26 may be secured to each clasp, and when two or more are used on the same clasp the crayons are of the same or different colors. In Figure 6 two crayons 26 are shown secured to the clasp, one by the bolt 23 and the other by having the inner end 24ª of its carrying spring 24 looped, as shown at 24ᵇ, about one bar of the clasp and thence extended to and connected to the bolt 23. In practice, certain of the hens of a laying house will each be provided with a clasp bearing a single crayon, and such crayons will be of different colors. The other hens of the laying house will each be provided with a clasp bearing a plurality of crayons, and some of these clasps will bear crayons of the same color and the others will bear crayons of different colors. Any clasp having a number of crayons of the same color will be different in color from the crayons of another class bearing a similar number of crayons.

From the foregoing description, taken in connection with the accompanying drawings, it will be seen that we have provided a door which may be readily secured to the front of a nest having a single entrance and exit opening and which will enable the poultryman to determine just which hen has laid the egg that is deposited in any nest. It should further be apparent that simple and efficient means are provided for obtaining a record of the laying capacity of the individual hens of a laying house, that the roller 16 is in such position on the door that it will expose a portion of the record sheet for contact by the crayons as the hens leave the nest, and that when the exposed portion of the record sheet has been used up a fresh portion thereof may be exposed for contact by the crayons by simply winding a portion of the record sheet onto the roller 17.

It should be understood that the drawings are merely illustrative and do not pretend to give exact proportions. Furthermore, the said drawings are illustrative of a preferred construction, it being our expectation that various changes and modifications may be made without departing from the spirit and scope of our invention.

What is claimed is:—

1. A trap nest comprising an inwardly and outwardly swinging door, means normally retaining the door in closed position, a bar secured to the door and provided with a shoulder, a movably mounted latch cooperating with said shoulder to secure the door against inward movement after a hen has entered the nest.

2. A trap nest including an inwardly and outwardly swinging door, means yieldingly retaining the door in closed position, a bar carried by the door and provided with relatively spaced shoulders, and a movably mounted latch adapted to be engaged with one of said shoulders to hold the door in a partly inwardly opened position and adapted to automatically engage the other shoulder after a hen has entered the nest to secure the door against inward movement.

3. A marker of the character set forth comprising a clasp, an elastic element carried by the clasp, a crayon carried by the elastic element, a ring, and a flexible element connecting the ring and clasp.

4. A marker of the character set forth comprising a clasp, a crayon carried by said clasp, means by which said clasp may be secured to the wing of the hen, and means by which said clasp may be connected to the leg of the hen.

5. A marker of the character set forth comprising a loop, means adapted to secure the loop to a hen, a laterally flexible member secured at one end to the loop by said means, and a crayon carried by the other end of said member.

6. A marker of the character set forth comprising a loop, means adapted to secure the loop to a hen, a laterally flexible member secured at one end to said means, a crayon carried by the other end of said member, a second laterally flexible member secured to said loop and to the first named flexible member, and a crayon carried by said second flexible member.

7. A trap nest including an inwardly and outwardly swinging metal door provided with inwardly directed flanges formed integrally therewith, rollers positioned between and journaled in said flanges, a record sheet carried by the rollers, and springs contacting with the rollers and one of said flanges to hold the former against casual movement.

In testimony whereof we affix our signatures.

VIRGIL C. BOX.
CLARENCE BOX.